Dec. 10, 1963  J. R. OISHEI  3,113,447
REMOTELY ACTUATED TRUNK LOCK ARRANGEMENT FOR A MOTOR VEHICLE
Filed Jan. 3, 1961  2 Sheets-Sheet 1
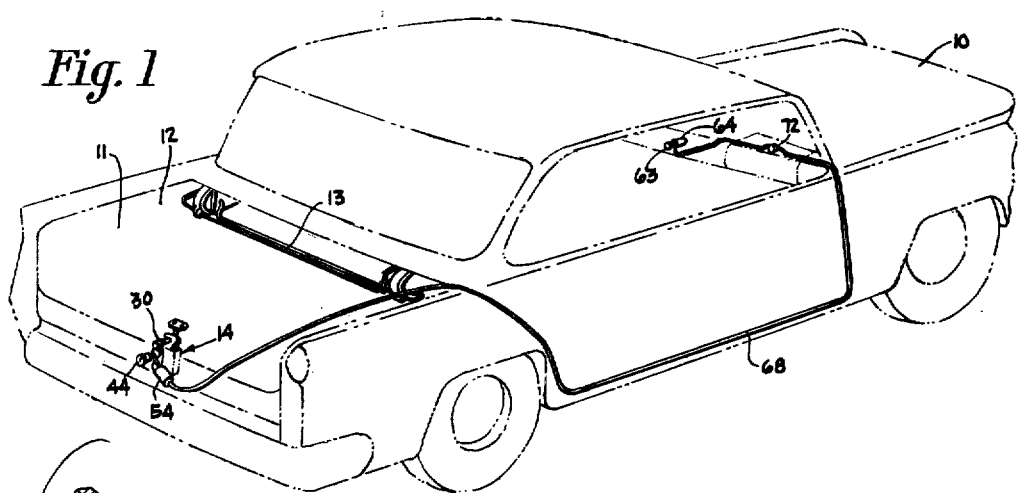
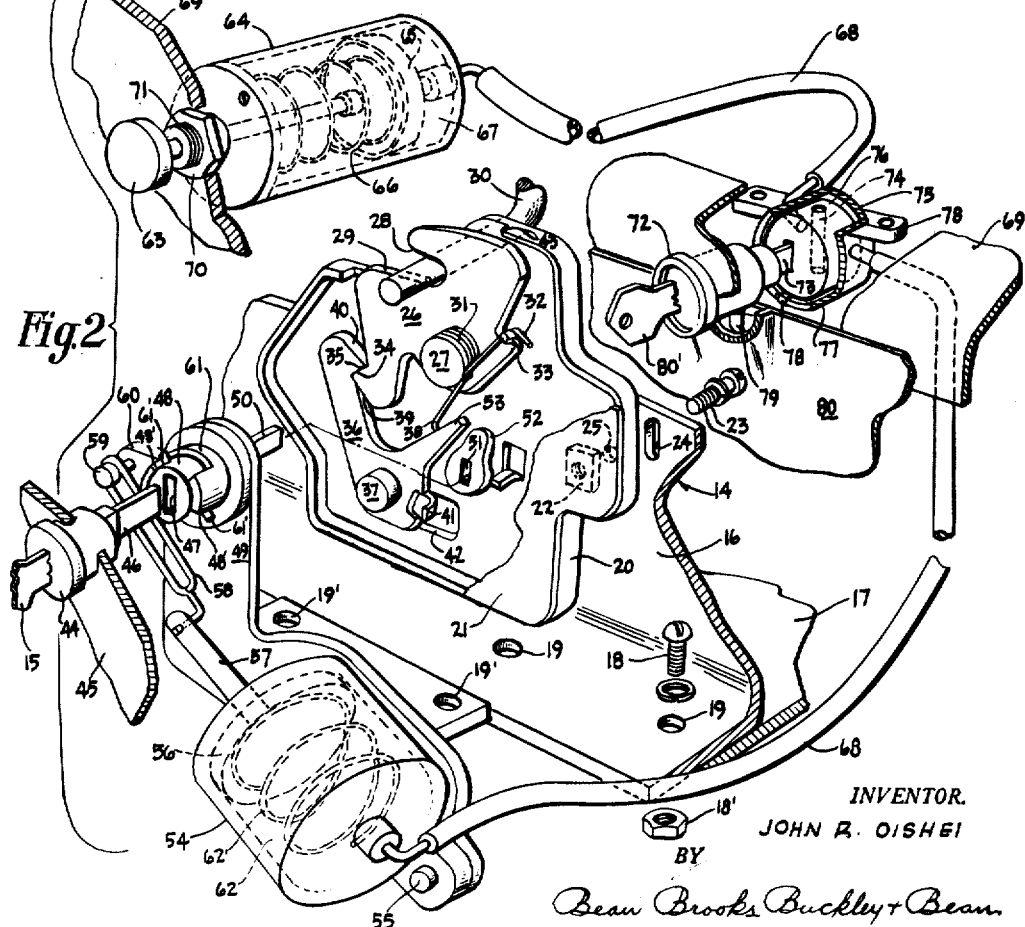
INVENTOR.
JOHN R. OISHEI
BY
Bean Brooks Buckley + Bean
ATTORNEYS Dec. 10, 1963  J. R. OISHEI  3,113,447
REMOTELY ACTUATED TRUNK LOCK ARRANGEMENT FOR A MOTOR VEHICLE
Filed Jan. 3, 1961  2 Sheets-Sheet 2
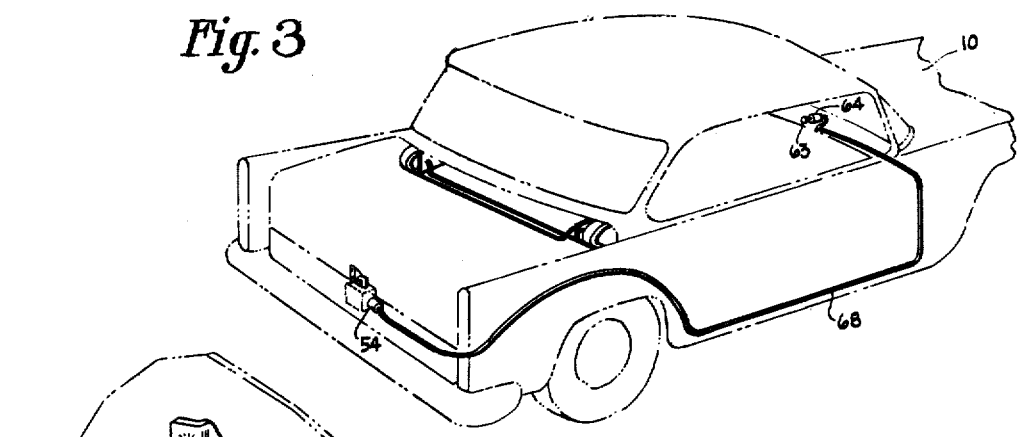
Fig. 3
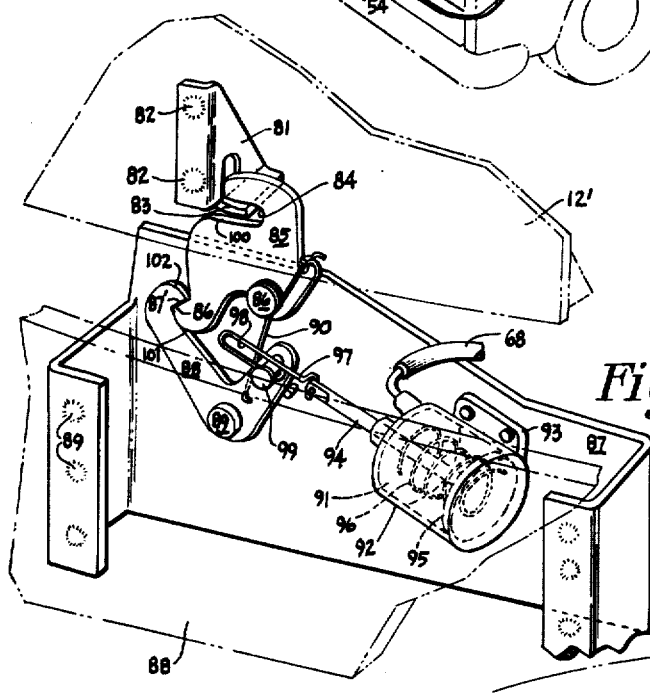
Fig. 4
Fig. 5
INVENTOR.
JOHN R. OISHEI
BY
Bean Brooks Buckley & Bean.
ATTORNEYS.

United States Patent Office 3,113,447
Patented Dec. 10, 1963

3,113,447
REMOTELY ACTUATED TRUNK LOCK ARRANGE-
MENT FOR A MOTOR VEHICLE
John R. Oishei, Buffalo, N.Y., assignor to Trico Products
Corporation, Buffalo, N.Y.
Filed Jan. 3, 1961, Ser. No. 80,482
13 Claims. (Cl. 70—262)

The present invention relates to an improved remote latch actuating mechanism for an automotive storage compartment lid.

It is the primary object of the present invention to provide a remote latch operating mechanism for a storage compartment lid which is dependent for operation solely on physical power exerted by a person within the vehicle and is completely independent of any source of power provided by the vehicle itself. Thus the trunk lid may be unlatched under any circumstances whatsoever, according to the desires of the vehicle operator, without regard to the condition of the various possible sources of energy within the vehicle.

Another object of the present invention is to provide a remote actuating system for a storage compartment lid latch which is readily accessible to any person in the front of the vehicle but which can be actuated for unlatching the storage compartment lid only when an operator controlled interlocking device permits the force produced by said person to be transmitted to the unlatching mechanism associated with the lid.

A further object of the present invention is to provide a remotely actuated automotive storage compartment lid latch actuating mechanism which effects unlatching only from a remote position within the vehicle and does not require the conventional lock associated with the storage compartment lid, thereby providing an arrangement which eliminates the cost of the lock currently associated with the storage compartment lid.

Still another object of the present invention is to provide a fluid pressure operated remote actuation system for actuating a vehicle accessory, the system being capable of supplying its own source of fluid pressure when it is properly manipulated, thereby rendering the system completely independent of an outside source of fluid pressure, the system also being able to automatically return to a neutral position when it is no longer actuated.

Yet another object of the present invention is to provide a remote unlatching arrangement for an automobile storage compartment lid which is economical to produce, simple to install, and dependable in operation. Other objects and attendant advantages of the present invention will readily be perceived hereafter.

In accordance with the present invention a fluid pressure remote actuating system is provided for actuating the latch associated with a vehicle storage compartment lid. In this respect, a fluid pressure motor is operatively coupled to the latch mechanism and a manually actuable fluid pressure pump is mounted within the vehicle. The pump and the motor are connected is closed circuit relationship by a flexible conduit. When remote unlatching of the vehicle lid is desired, a person within the vehicle need merely manually actuate the pump to thereby cause a movable wall thereof to change the fluid pressure in the pump chamber, and this fluid pressure is transmitted to the motor chamber to move a movable wall associated therewith, the latter movable wall being connected to the storage compartment lid latch. When the storage compartment lid is thus unlatched, the spring associated with the lid will cause it to open. Furthermore, springs are associated with both the pump and the motor to return them to a normal neutral position after the pump actuating mechanism is released, thereby preparing the fluid pressure system for a subsequent unlatching action.

In accordance with one embodiment of the present invention the above-mentioned fluid pressure operated remote actuating structure is incorporated with the existing trunk unlatching mechanism of the vehicle to thus permit the storage compartment lid to be selectively unlatched from a remote position by the use of the above-described structure, or by the use of a key for unlocking the lock which is located in the vicinity of the lid itself.

In accordance with a second embodiment of the present invention the conventional lock associated with the storage compartment lid is eliminated and unlatching of the lid is effected solely from inside of the vehicle by the above-described fluid pressure actuated remote latch actuating arrangement. This embodiment has the advantage of low cost in that the lock structure associated with the latch is eliminated.

In either of the foregoing embodiments the fluid pressure pump and the fluid pressure motor may be connected directly to each other by an unbroken conduit. In such an arrangement there is no way of disconnecting the pump from the fluid pressure motor. However, in either of the above-described embodiments, an interlock arrangement may be provided to prevent the manipulation of the pump from resulting in actuation of the motor to effect an unlatching operation. Accordingly, a valve actuated by the glove compartment lock is provided to either permit or prevent the pump from communicating with the fluid pressure motor. More specifically, when the glove compartment lock is locked, communication will be prevented, and when it is unlocked, communication will be permitted. The advantage of the foregoing arrangement is that a vehicle operator may leave his car unlocked but may lock the glove compartment lock to prevent unauthorized manipulation of the pump to unlatch the trunk lid. The present invention will be more fully understood when the following portions of the specification are read in conjunction with the accompanying drawings wherein:

FIG. 1 is a perspective view of an automotive vehicle containing the improved remote latch actuating system of the instant invention;

FIG. 2 is a fragmentary perspective view of one embodiment of the present invention with certain components of the system shown in exploded form in the interest of clarity;

FIG. 3 is a perspective view of an automotive vehicle having a simplified form of the present invention;

FIG. 4 is a perspective view of another form of the present invention wherein the key actuated lock associated with the vehicle trunk lid is omitted; and FIG. 5 is a view of still another form of the present invention.

In FIG. 1 an automotive vehicle 10 is shown having a trunk or storage compartment 11 with a lid 12. The lid is provided with a suitable torsion spring arrangement 13 which causes the lid to pop open when latch 14 associated with the lid is unlatched either by the use of lid unlatching key 15 or the use of the fluid pressure remote unlatching system described hereafter. The torsion spring arrangement 13 is conventional and will not be described in detail.

The trunk latch arrangement 14 includes a bracket 16 which is secured to the floor 17 of the trunk or storage compartment 11 as by screws 18 fitting through suitable apertures 19 and nuts 18', or by welding in lieu of the foregoing mode of attachment. The latch mechanism includes a housing 20 having a cover plate 21 mounted thereon. Cover plate 21 in turn has a plurality of nuts such as 22 affixed thereto for threadably receiving screws 23 which extend through slot 24 in bracket 16 and aperture 25 in housing 20. It can readily be seen that the foregoing mode of connecting housing 20 to bracket 16 permits adjustment of the latch mechanism relative to the bracket. As noted above, a plurality of screws such as 23 are used instead of the one shown in the drawing.

The latch mechanism includes a latching plate 26 generally in the form of a bell crank lever pivotally mounted on pin 27 extending from the housing. Latch plate 26 includes a keeper receiving recess 28 having an extended edge 29 which is adapted to be struck by keeper 30 which is suitably affixed to the storage compartment lid as by welding (not shown) or by adjustable screws (not shown). A coil spring 31 encircles pin 27 and has one end 32 thereof abutting flange 33 of latch plate 26, thereby tending to bias plate 26 in a clockwise direction. Latch plate 26 is formed with a latching portion 34 which is engaged by latching portion 35 of bell crank lever 36 which is pivotally mounted on pin 37 extending from the housing 20. The leg of bell crank lever 36 which is remote from latching portion 35 is in engagement with the other end 38 of spring 31 which therefore biases bell crank lever 36 in a clockwise direction. When latch plate 26 is in an unlatched condition, it is pivoted clockwise from the position shown n FIG. 2 so that when the end of keeper 30 is brought down into engagement with extended edge 29, latch plate 26 will pivot in a counter-clockwise direction against the bias of spring 31 until such time that slot 28 receives keeper 30. Furthermore, the outer surface 39 of locking shoulder 34, during the foregoing counter-clockwise movement, will slide on surface 40 of latching portion 35 and therefore pivot bell crank lever 36 in a counterclockwise direction against the bias of spring 31. The foregoing movement will continue until such time as latching portions 34 and 35 are in engagement to prevent clockwise unlatching movement of plate 26. The limit of clockwise movement of bell crank lever 36 is determined by flange 41 abutting surface 42 of housing 20 and the limit of clockwise movement of latch plate 26 is determined by engagement between it and shoulder 43.

The foregoing described latch may be unlatched by the use of a key lock normally associated with the lid 12. To this end the lock 44, which is mounted in the portion of the automobile body 45, has a shank 46 extending from the rear thereof which is received in slot 47 of connector 48 which is journaled in sleeve 61 which is in turn journaled in bracket 49. Sleeve 61 in turn has shank 50 mounted for rotation therewith, shank 50 being in turn received in slot 51 of rocker 52. It can readily be seen therefore that manipulating key 15 in a counterclockwise direction will cause a corresponding counterclockwise movement of rocker 52, because pins 61' of connector 48 will engage shoulders 48' of sleeve 61 and cause sleeve 61 to also move in a counterclockwise direction when key 15 is moved in a counterclockwise direction. The foregoing action will cause rocker 52 to engage leg 53 of bell crank lever 36 to disengage latching portions 34 and 35 and permit spring 31 to bias latching plate 26 in a clockwise direction to release keeper 30 from slot 38. When the foregoing is effected, the above mentioned torsion spring 13 will lift lid 12 and cause it to spring open.

An arrangement is also provided for unlatching the above described latch structure from a remote position. To this end bracket 49 has a fluid pressure motor 54 pivotally mounted thereon by pin 55. Bracket 49 has holes 19' therein which are adapted to register with holes 19 of bracket 16 and screws 18 secure bracket 49 to bracket 16. Motor 54 has a piston or movable wall 56 therein to which is attached shaft 57 which in turn has one end of slotted link 58 pivotally attached to the end thereof, the other end of slotted link 58 encircling pin 59 which is mounted on arm 60 of sleeve 61. Whenever chamber 62 of motor 54 is evacuated, piston 56 will move to the right and move shaft 57 to the right correspondingly. This will cause sleeve 61 to pivot in a counterclockwise direction and pivot rocker 52 correspondingly to effect an unlatching action in the same manner as described above in response to manual action. It will readily be seen that there is a lost motion connection between pins 61' and shoulders 48' when sleeve 61 is pivoted in a counterclockwise direction as noted above. Thus, the counterclockwise rotational movement of sleeve 61 as effected by motor 54 will not be impeded by the structure of lock 44.

In order to evacuate chamber 62, handle 63 of pump 64 is pulled to the left to thereby cause piston 65 to also move to the left against the bias of spring 66. This action tends to cause evacuation of chamber 67 and this evacuating action is transmitted to chamber 62 of motor 54 through conduit 68. Pump 64 is mounted on the dash board 69 by nut 70 mounted on threaded shaft 71 which forms a part of the pump housing and extends through a suitable aperture (not shown) on the dash board.

However, in accordance with one embodiment of the present invention, the glove compartment lock 72 must be in an unlocked condition in order to permit the above communication between pump chamber 67 and motor chamber 62 through conduit 68. More specifically, when lock 72 is in an unlocked position, the shank 73 at the end thereof causes conduit 74 of valve 75 to be in alignment with the ends of conduit 68 to permit the above communication to take place. Conduit 74 is located in valve 76 which is rotatably mounted in housing 77 and held therein as by staked portions 78. Housing 75 in turn is affixed to the top of the dash board 69 by screws or the like (not shown) extending through bracket 78. The latch of lock 72 engages the edge of 79 of door 80 to hold the door closed.

It will readily be appreciated therefore that unlatching of the trunk lid 12 by manipulating handle 63 of pump 64 may be prevented by locked glove compartment 72 by the use of key 80'. This action will permit a person to leave the car doors unlocked without having to fear that someone will unauthorizedly unlatch the trunk by manipulating handle 63 of pump 64.

A simplified embodiment of the present invention is shown in FIGURE 3 wherein the automotive vehicle 10 contains all the elements of the system disclosed in FIGURES 1 and 2 except the interlocking valve 76 associated with glove compartment lock 72. In other words, conduit 68 is continuous.

In FIGURE 4 an alternate embodiment of the present invention is disclosed. This alternate embodiment can utilize the continuous connection arrangement such as shown in FIGURE 3 or the arrangement which possesses the interlocking valve 76 such as shown in FIGURE 1. The embodiment of FIGURE 5 obviates the necessity of a lock on the outside of the vehicle lid for unlatching the latter and relies solely on the operation of the remote fluid pressure actuated unlatching system for opening the lid 12. More specifically, in FIGURE 4 the lid 12' has a keeper bracket 81 affixed thereto as by welds 82. In lieu of welds 82 an adjustable bracket may be used. The keeper bar 83 fits within slot 84 of bell crank type of keeper plate 85 which is pivotally mounted on the pin 86 of bracket 87 which is in turn affixed to the vehicle body 88 as by welds 89. In lieu of welds 89, screws may be used to adjustably mount bracket 87 on the vehicle body. Latch plate 85 has a latching portion 86 which is adapted to coact with the latching portion 87' of bell crank lever 88 which is pivotally mounted on pin 89 extending from bracket 87. A spring 90 encircles pin 86 and biases latch plate 85 and bell crank lever 88 in a clockwise direction about their respective pins. Suitable stop mechanisms (not shown) are provided to limit the clockwise movement of elements 85 and 88 when they are not in latching engagement as shown. When it is desired to unlatch keeper 83, it is merely necessary to evacuate chamber 91 of motor 92 which is mounted on bracket 87 by flange 93. The evacuation of chamber 92 through a conduit, such as 68, will cause shaft 94 to move to the left as piston 95 moves to the left against the bias of spring 96. The right hand portion of slot 98 of link 97 will therefore abut pin 99 on bell crank lever 88 and cause it to pivot in a counterclockwise direction against the bias of spring 90. When latching portion 87' moves a sufficient distance spring 90 will cause latch plate 85 to pivot in a clockwise direction to thereby free keeper 83. Thereafter the torsion springs will lift the lid 12'. When lid 12' is closed, keeper 83 will engage surface 100 and pivot latch plate 85 in a counterclockwise direction about pin 86 whereby cam surfaces 101 and 102 will ride along each other until such time as latching portions 86 and 87' return to the condition shown in the drawing wherein latch is kept. The slot 98 provides for lost motion of pin 99 during the foregoing latching movement. As noted above, it can readily be appreciated that the remote unlatch action disclosed in FIGURE 4 may be utilized with the interlock of FIGURES 1 and 2 or without it as shown in FIGURE 3. The pump for effecting actuation of motor 92 may be identical to the pump 64 of FIGURE 2.

It will be noted that spring 96 is associated with motor 92 in FIGURE 4 and that spring 62' is associated with motor 54 of FIGURE 2. Furthermore, pump 64 has spring 66 associated therewith. Whenever the pump is released, the above described springs will return their respective motors and the pump to a neutral condition to prepare the system for a subsequent unlatching operation.

Still a further embodiment of the present invention is disclosed in FIGURE 5. In this embodiment the pump for evacuating line 68 is mounted within glove compartment 103. The shaft 104 of pump 105 has a head portion 106 which is adapted to be engaged by forked end 107 of lever 108 which is rigidly mounted at 109 to the bottom of glove compartment door 110. When the glove compartment door 110 is opened to the position shown in FIGURE 5, there will be no unlatching of the trunk lid by evacuation of conduit 68 leading to motors such as 92 (FIGURE 4) or 54 (FIGURE 2). However, if such unlatching is desired, it is merely necessary to press downwardly on door 110 to cause shaft 105 to move to the left and carry piston 111 with it against the bias of spring 112 to thereby effect the necessary evacuation of conduit 68. When door 110 is released, spring 112 will return pump 105 to the condition shown in FIGURE 5. It will readily be appreciated that if the glove compartment door is locked, there can be no remote unlatching of the lid latch. Furthermore, when glove compartment door 110 is closed, lever 108 assumes a generally horizontal position out of engagement with the head 106 of shaft 104. Furthermore, if desired a detent or the like may be provided in conjunction with door 110 to prevent a person from accidentally pressing on this door and accidentally unlatching the trunk lid. More specifically, the detent may be of the type which requires that a stop be specifically disengaged to permit door 110 to be moved to an unlatching condition.

While all of the above systems have described the manually actuated pumps as producing vacuum, it will readily be appreciated that with suitable modification the pumps can provide compressed air and that the motors associated with the latches may be made responsive to said compressed air for effecting unlatching of the lid latches.

It will readily be appreciated that the above described embodiments of the instant invention are manifestly capable of achieving the above enumerated objects and that while preferred embodiments of the present invention have been disclosed, it is to be understood that the present invention is not to be limited thereto, but may be otherwise embodied within the scope of the following claims.

I claim:

1. In a latch lock mechanism for locking a lid of a storage compartment of an automotive vehicle; the combination comprising latch means, lock means operatively associated with said latch means, fluid pressure motor operatively mounted proximate said latch means, said fluid pressure motor having a first chamber with a first movable wall, linkage means operatively coupling said first movable wall to said latch means, a fluid pressure pump having a second chamber and a second movable wall, conduit means operatively connecting said first and second chambers in closed circuit relationship, manual means for actuating said pump and thereby moving said second movable wall thereby tending to change the pressure of said fluid in said second chamber, said conduit means transmitting said change in pressure to said first chamber whereby said first movable wall tends to move in synchronism with said manually actuated second movable wall to thereby cause unlatching of said latch means by virtue of the connection between first movable wall and said latch means, first spring means operatively associated with said first movable wall and second spring means operatively associated with said second movable wall whereby the release of said manual means after said pump has been actuated results in said first and second movable walls returning to the positions they occupied before said manual means were actuated, said spring means thereby conditioning said motor and pump for a subsequent unlatching of said latch means.

2. The combination set forth in claim 1 and including interlock means operatively associated with said conduit means for selectively permitting or preventing said above-mentioned communication between said fluid pressure pump and said fluid pressure motor whereby said pump may be selectively rendered ineffective for actuating said motor means.

3. The combination as set forth in claim 2 wherein said interlock means comprises a valve operatively associated with a remotely located lock of the vehicle to permit said communication when said remotely located lock is unlocked and to prevent said communication when said remotely located lock is locked.

4. In a latch mechanism for locking a lid of a storage compartment of an automotive vehicle; the combination comprising latch means and a fluid pressure remote latch actuating mechanism constituting the sole means of unlatching said latch means comprising a fluid pressure motor having a first chamber with a first movable wall mounted proximate said latch means, linkage means operatively coupling said first movable wall to said latch means, a fluid pressure pump having a second fluid pressure chamber and a second movable wall, conduit means placing said first and second chambers in communication with each other to provide a closed circuit relationship therewith, a compressible fluid in said closed circuit manual means for moving said second movable wall of said pump to thereby tend to change the pressure of fluid in said second chamber, said change in pressure being transmitted to said first chamber through said conduit means whereby the movement of said second movable wall results in a generally corresponding movement of said first movable wall to thereby unlatch said latch means by virtue of said linkage connecting said first movable wall to said latch means, and first and second spring means operatively associated with said first and second movable walls, respectively, to cause said first and second movable walls to return to a neutral position by virtue of the low resistance offered by said compressible fluid in said closed circuit after said manual means are released whereby said pump means and said motor means return to a neutral condition in preparation for a subsequent unlatching stroke.

5. The combination as set forth in claim 4 and including interlock means operatively associated with said conduit means for selectively permitting or preventing said above-mentioned communication between said fluid pressure pump and said fluid pressure motor whereby said pump may be selectively rendered ineffective for actuating said motor means.

6. The combination as set forth in claim 5 wherein said interlock means comprises a valve operatively associated with a remotely located lock to permit said communication when said remotely located lock is unlocked and to prevent said communication when said remotely located lock is locked.

7. In a latch lock mechanism for locking a lid of a storage compartment of an automotive vehicle; the combination comprising latch means, a fluid pressure motor operatively mounted proximate said latch means, said fluid pressure motor having a first chamber with a first movable wall, linkage means operatively coupling said first movable wall to said latch means, a fluid pressure pump having a second chamber and a second movable wall, conduit means operatively connecting said first and second chambers in closed circuit relationship, manual means for actuating said pump and thereby moving said second movable wall thereby tending to change the pressure of said fluid in said second chamber, said conduit means transmitting said change in pressure to said first chamber whereby said first movable wall tends to move in synchronism with said manually actuated second movable wall to thereby cause unlatching of said latch means by virtue of the connection between first movable wall and said latch means, and means operable after said manual means are released to cause said movable walls to return to the positions they occupied before said manual means were actuated, thereby conditioning said motor and pump for a subsequent unlatching action.

8. In a latch mechanism for latching a lid of a storage compartment of an automotive vehicle; the combination comprising latch means and a fluid pressure remote latch actuating mechanism constituting the sole means of unlatching said latch means to permit said opening of said lid comprising a fluid pressure motor having a first chamber with a first movable wall mounted proximate said latch means, linkage means operatively coupling said first movable wall to said latch means, a fluid pressure pump mounted within said vehicle having a second fluid pressure chamber and a second movable wall, conduit means placing said first and second chambers in communication with each other in closed circuit relationship, manual means for moving said second movable wall of said pump to thereby tend to change the pressure of fluid in said second chamber, said change in pressure being transmitted to said first chamber through said conduit means whereby the movement of said second movable wall results in a generally corresponding movement of said first movable wall to thereby unlatch said latch means by virtue of said linkage connecting said first movable wall to said latch means, and means operative after said manual means are released to cause said movable walls to return to the positions they occupied before said manual means were actuated, thereby conditioning said motor and pump for a subsequent unlatching action.

9. An automotive vehicle having a storage compartment with a lid for closing the same, latch means for maintaining the lid closed, unlocking means associated with the latch means for rendering the latter inoperative to permit opening the compartment, an actuator for the unlocking means accessible from within the vehicle and connected to said unlatching means by a power transmitting linkage for actuating said unlocking means to give access to the compartment, said vehicle having a second compartment with a door for closing the same, a lock for securing the door in its closed position and a unit associated with the lock within the second compartment and interposed in the power transmitting linkage to render the latter inoperative when the door is locked, said unit being responsive to said unlocking means for establishing an operative connection between the actuator and the unlocking means when the door is opened.

10. A system for remotely actuating a latch comprising a fluid pressure motor operatively mounted proximate said latch, said fluid pressure motor having a first chamber with a first movable wall, linkage means operatively coupling said first movable wall to said latch, a fluid pressure pump having a second chamber and a second movable wall, a single conduit operatively connecting said first and second chambers to provide a closed circuit therewith, manual means for effecting movement of said second movable wall thereby tending to change the pressure of fluid in said second chamber, said single conduit means transmitting said change in pressure to said first chamber whereby said first movable wall tends to move in synchronism with said second movable wall to thereby cause said linkage means to actuate said latch, and means automatically operable after said manual means are released to cause said first and second movable walls to return to the position which they occupied before said manual means were actuated.

11. In a latch lock mechanism for locking a lid of a storage compartment of an automotive vehicle; the combination comprising latch means, lock means operatively associated with said latch means, a fluid pressure motor operatively mounted proximate said latch means, said fluid pressure motor having a first chamber with a first movable wall, linkage means operatively coupling said first movable wall to said latch means, a fluid pressure pump having a second chamber and a second movable wall, conduit means operatively connecting said first and second chambers in closed circuit relationship, manual means for actuating said pump and thereby moving said second movable wall thereby tending to change the pressure of said fluid in said second chamber, said conduit means transmitting said change in pressure to said first chamber whereby said first movable wall tends to move in synchronism with said manually actuated second movable wall to thereby cause unlatching of said latch means by virtue of the connection between first movable wall and said latch means, first spring means operatively associated with said first movable wall and second spring means operatively associated with said second movable wall whereby the release of said manual means after said pump has been actuated results in said first and second movable walls returning to the positions they occupied before said manual means were actuated, said spring means thereby conditioning said motor and pump for a subsequent unlatching of said latch means and interlock means operatively associated with said conduit means for selectively permitting or preventing said above mentioned communication between said fluid pressure pump and said fluid pressure motor whereby said pump may be selectively rendered ineffective for actuating said motor means.

12. The combination as set forth in claim 11 wherein said interlock means comprises a valve operatively associated with a remotely located lock of the vehicle to permit said communication when said remotely located lock is unlocked and to prevent said communication when said remotely located lock is locked.

13. A system for remotely actuating a latch comprising a fluid pressure motor operatively mounted proximate said latch, said fluid pressure motor having a first chamber with a first movable wall, linkage means operatively coupling said first movable wall to said latch, a fluid pressure pump having a second chamber and a second movable wall, a single conduit operatively connecting said first and second chambers to provide a closed circuit therewith, manual means for effecting movement of said second movable wall thereby tending to change the pressure of fluid in said second chamber, said single conduit means transmitting said change in pressure to said first chamber whereby said first movable wall tends to move in synchronism with said second movable wall to thereby cause said linkage means to acuate said latch, and means automatically operable after said manual means are released to cause said first and second movable walls to return to the position which they occupied before said manual means were actuated and interlock means operatively associated with said conduit means for selectively permitting or preventing communication between said first and second chambers whereby said pump may be selectively rendered ineffective for actuating said fluid pressure motor.

References Cited in the file of this patent

UNITED STATES PATENTS

| | | |
|---|---|---|
| 1,460,609 | Scola | July 3, 1923 |
| 1,555,174 | Williams | Sept. 29, 1925 |
| 2,509,623 | Baade | May 30, 1950 |
| 2,535,600 | Rappl | Dec. 26, 1950 |
| 2,688,865 | Foster et al. | Sept. 14, 1954 |
| 2,896,990 | Garvey et al. | July 28, 1959 |
| 3,016,968 | Lenz et al. | Jan. 16, 1962 |

UNITED STATES PATENT OFFICE
CERTIFICATE OF CORRECTION

Patent No. 3,113,447 December 10, 1963

John R. Oishei

It is hereby certified that error appears in the above numbered patent requiring correction and that the said Letters Patent should read as corrected below.

Column 6, line 57, after "circuit" insert a comma.

Signed and sealed this 28th day of April 1964.

(SEAL)
Attest:

ERNEST W. SWIDER
Attesting Officer

EDWARD J. BRENNER
Commissioner of Patents